(12) United States Patent
Alvarez et al.

(10) Patent No.: US 7,167,965 B2
(45) Date of Patent: Jan. 23, 2007

(54) METHOD AND SYSTEM FOR ONLINE DATA MIGRATION ON STORAGE SYSTEMS WITH PERFORMANCE GUARANTEES

(75) Inventors: Guillermo A. Alvarez, San Jose, CA (US); Chenyang Lu, Charlottesville, VA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1271 days.

(21) Appl. No.: 09/843,882

(22) Filed: Apr. 30, 2001

(65) Prior Publication Data

US 2002/0174419 A1    Nov. 21, 2002

(51) Int. Cl.
*G06F 12/00* (2006.01)
*G06F 9/44* (2006.01)

(52) U.S. Cl. .................. 711/165; 717/127; 717/131

(58) Field of Classification Search ............... 711/165; 717/127, 131; 707/200
See application file for complete search history.

(56) References Cited

U.S. PATENT DOCUMENTS

| 6,105,117 | A * | 8/2000 | Ripley .................. 711/165 |
| 6,108,748 | A * | 8/2000 | Ofek et al. ............ 711/165 |
| 6,230,239 | B1 * | 5/2001 | Sakaki et al. ......... 711/161 |
| 6,341,333 | B1 * | 1/2002 | Schreiber et al. ..... 711/114 |
| 6,636,951 | B1 * | 10/2003 | Tachikawa ............. 711/165 |

OTHER PUBLICATIONS

Microsoft Press Computer Dictionary, Third Edition (1997), p. 179.*

* cited by examiner

*Primary Examiner*—Tuan Dam
*Assistant Examiner*—Michael J. Yigdall

(57) ABSTRACT

Data is migrated by moving a set of the data in a data storage system of a computer system. The method includes monitoring a performance of at least one executing application while moving the data in the data storage system. A change in the rate of moving is calculated in response to the monitored performance of the executing application. The rate of moving is modified in accordance with the calculated change.

23 Claims, 9 Drawing Sheets

METHOD AND SYSTEM FOR ONLINE DATA MIGRATION ON STORAGE SYSTEMS WITH PERFORMANCE GUARANTEES

TECHNICAL FIELD

The invention relates to data migration. More particularly, the invention relates to migrating data on a computer storage system from an initial placement to a target placement while ensuring the performance goals of foreground applications executing on the computer system.

DESCRIPTION OF RELATED ART

Computer systems typically involve a plurality of subsystems such as host computers, network, software applications, and data storage. The goal of said subsystems is to provide different kinds of services. For example, network components provide the service of interconnecting other components; storage devices provide the service of storing customer data, and providing access to the stored data on demand. Computer systems are designed to execute client applications with given performance and reliability requirements. Even though users ultimately need that application-level requirements be met, said requirements must be translated, in turn, into requirements for the subsystems. In a well-designed system, if subsystem-level requirements are satisfied, then the system as a whole satisfies the application-level requirements as well.

Some of the decisions to be made during system design involve the placement of client data: which piece of data is going to be stored in which storage device. Clearly, those decisions have performance and reliability implications. For example, data co-located in the same storage device will become unavailable at the same time if the device experiences a severe failure. Similarly, storage devices have a limited amount of bandwidth to communicate with the rest of the system; the sum of the access rates for all data stored in the same device must not exceed the device's capabilities. The problem is further complicated by the fact that the same piece of data can be replicated on several different devices, for improved reliability (some copies left even after some others become unavailable) and/or performance (access the copy that's closest to the accessing host). A carefully designed data placement (or, equivalently, data distribution) may be essential for the overall performance and reliability of a computer system.

However, an initially adequate distribution of customer information onto a data storage system of a computer system may become inadequate later in the lifetime of the system. A change in the workload may require that new application software and/or data sets be added to the computer system, or that the rate at which already—present data is accessed be considerably increased—potentially requiring that new hosts or storage devices be added to cope with the increased workload. Moreover, failures or the addition of individual components in the data storage system may contribute to the change of the overall distribution of customer information on the computer system. Such events may require a data migration, during which the customer information is re-distributed to re-optimize the performance of the computer system. A move is the relocation of an unspecified amount of customer information, from a source location to a destination location. The destination location of a given move may or may not be the final intended destination of the data; since storage devices have limited capacity, it may be necessary to make intermediate moves to non-final locations in order to free up space at the source. A data migration plan is a partially ordered set of moves. When the moves are executed in the order prescribed by the plan, the system goes from the existing, initial placement to the desired, target placement. All solutions to the migration problem follow a plan; the unrestricted case in which all moves are allowed to execute in parallel is a special case of a plan, in which there are no inter-move dependencies.

FIG. 8 illustrates a block diagram of a computer system 800 implementing an off-line data migration, one of the existing solutions to the problem. As shown in FIG. 8, the computer system 800 includes a central processing unit ("CPU") module 810 and a data storage system 820. The CPU module 810 may be configured to execute the software applications 830 in the foreground. The software applications 830 may be the programs that users of the computer system 800 typically execute to perform tasks; the data accessed by applications 830 are typically stored on the data storage system 820. The CPU module 810 may be implemented by a personal computer, a workstation, a server, and the like. The data storage system 820 may be implemented by any combination of disk drives, redundant arrays of independent disks ("RAID"), systems of independent disks ("JBOD"), and the like. The CPU module 810 may be interfaced with the disk storage system 820 by an input/output bus, a network, and the like.

The computer system 800 includes a migration engine 840, which is configured to migrate data from the initial placement to the target placement within the data storage system 820. The system depicted in FIG. 8 migrates data by shutting down the computer system 800, i.e., by temporarily severing the interface between the CPU module 810 and the data storage system 820. Only after the data migration is complete, the computer system 800 will continue accessing the storage system 820. This has the benefit that it makes it easy to guarantee that customer data will remain consistent, as the presence of non-coordinated concurrent readers and writers could otherwise result in data corruption. However, during the data migration, the computer system 800 is unavailable to the customer. This type of shutdown can incur substantial business costs, which are unacceptable in many modern business-computing environments.

FIG. 9 illustrates a block diagram of a computer system 900 implementing another existing data migration scheme: unrestricted online data migration. In particular, the computer system 900 includes a CPU module 910 and a data storage system 920. The CPU module 910 may be configured to execute software applications 930 in the foreground as described in FIG. 8. The computer system 900 includes a migration engine 940, which is also configured to migrate data from an initial placement to a target placement within the data storage system 920. In this case, the migration engine 940 implements a data migration as an application program executing on the computer system 900. To guarantee data consistency, the migration program may have to prevent the user applications 930 from accessing the information while it is being migrated, for example using a lock scheme for mutual exclusion. The drawback of this scheme is that it prevents users from accessing subsets of the information during migration. Another drawback is that the migration task requires computer system resources in addition to the resources consumed by user applications 930. For example, the migration task performs additional accesses on the storage system to move data from one location to another, uses additional network bandwidth to transfer the data being migrated, and consumes computation cycles to execute the migration task. As a result, the user applications 930 may experience, during migration, a performance degradation they cannot tolerate.

A popular variation on this solution is to attempt data migration during the "quiet periods" of the computer system. A quiet period may be when the foreground load is small, i.e., a few application programs are executing, or non-time-critical. For example, data migrations can be scheduled to occur during the nights. The additional overhead of executing the data migration may have little impact on the performance of the still-executing application programs. This technique works well, but is becoming less effective as computer systems execute application programs at full capacity around the clock. Another possibility is to design migration plans in such a way that they will not interfere with foreground load. The drawbacks of this approach are that it is very difficult to predict, at a reasonably fine granularity, when the foreground applications will be idle. Moreover, this scheme cannot avoid interfering with foreground load when unforeseen circumstances, such as load spikes and failures, occur.

As discussed above, current data migration techniques do not provide users with unrestricted access to their information during data migration. The data migration should occur on-line while the application software is executing, i.e., writing and reading data, in the foreground of a computer system. Furthermore, migration should consume the resources that are truly available in the system; it is not acceptable for migration to interfere with the quality of service requirements of user applications.

SUMMARY OF INVENTION

In accordance with the principles of the present invention, a method for migrating data is disclosed. The method includes moving a set of data and monitoring a performance of at least one executing application. The method further includes modifying a rate of the moving in response to the monitoring.

One aspect of the present invention is a system for migrating data on a computer system. The system includes a monitor configured to monitor a performance of at least one application executing on the computer system and a controller configured to compare the performance with a performance goal of the at least one application. The system also includes an actuator configured to adjust a rate of movement of a set of data from one location in the computer system to another location in the computer system. The controller is further configured to adjust the rate of movement in response to the comparison between monitored performance and the performance goal.

Another aspect of the present invention is a computer readable storage medium on which is embedded one or more computer programs. The embedded one or more computer programs include instructions for moving a set of data in a data storage system of a computer system and monitoring a performance of at least one application executing on the computer system. The instructions further include modifying a rate of the moving in response to the monitoring.

In comparison to known prior art, certain embodiments of the invention are capable of achieving certain advantages, including some or all of the following: (1) data migration without violating any of the foreground application performance requirements (assuming the eventual existence of spare resources in the computer system); (2) minimization of the time to perform the migration; and (3) adaptation of the data migration to unforeseen changed conditions in a computer system.

Additional advantages and novel features of the invention will be set forth in part in the description which follows and in part will become apparent to those skilled in the art upon examination of the following or may be learned by practice of the invention.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplary embodiment thereof. Although the preferred embodiment of the invention may be practiced as a software system, one of ordinary skill in the art will readily recognize that the same principles are equally applicable to, and can be implemented in, a hardware system, and that any such variation would be within such modifications that do not depart from the true spirit and scope of the present invention.

In accordance with the principles of the present invention, the migration executor part of an on-line data migration engine is utilized to provide data migration of a user's data in a data storage system while maintaining application performance guarantees. In particular, the migration executor includes a monitor module configured to monitor performance parameters of a computer system executing foreground applications, where the performance parameters are forwarded to a controller module. The controller module of the migration executor may be configured to compare the monitored performance parameters of the computer system with performance goals for the foreground applications. The controller module may be further configured to issue commands to an actuator module that is configured to increase or decrease the rate of the data migration, where the actuator module is further configured to perform the data migration by executing a migration plan. The migration executor further includes a logical-volume ("LV") mover, which is configured to move blocks of data within the data storage system of the computer system in response to a command from the actuator module. Each invocation of the LV mover initiates a move in the migration plan. Accordingly, foreground applications may meet their performance goals during a data migration, thereby providing full computer system availability and performance during the on-line data migration.

Moreover, by applying a feedback-based control system to regulate the rate of data migration as a function of the performance being observed by foreground applications, the migration executor provides the capability of adapting the data migration to unforeseen changed conditions in a computer system. More precisely, the rate at which moves are executed is dynamically varied in such a way that only the excess capacity of the system is used for migration, without consuming resources required for foreground processing. Thus, users may be provided the capability of full computer system performance.

Figure 1:
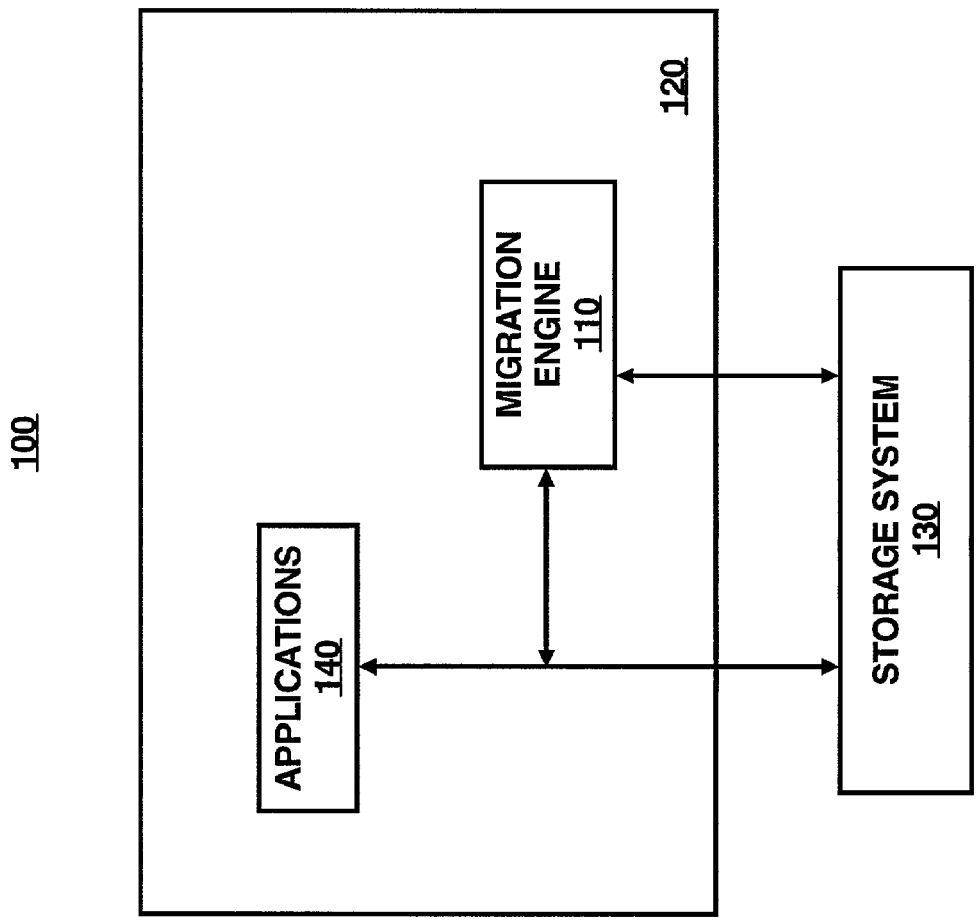
FIG. 1 illustrates an exemplary embodiment of a migration engine according to the principles of the present invention.

FIG. 1 illustrates a block diagram of a computer system 100 with an embodiment of a migration engine 110 according to the principles of the present invention. As shown in FIG. 1, the migration engine 110 of the computer system 100 is configured to interface with a central processing unit ("CPU") module 120 and a data storage system 130. The CPU 120 may be configured to provide a computing platform to execute software applications, or foreground applications 140, initiated by users of the computer system 100. The CPU module 120 may be implemented by a personal computer, a workstation, a server, and the like. The data storage system 130 is configured to provide storage of the software applications executed by the CPU module 120 and data for users of the computer system 100. The data storage system 130 may be implemented by any combination of disk drives, redundant arrays of independent disks ("RAID"), systems of independent disks ("JBOD"), and the like. The CPU module 120 may be interfaced with the disk storage system 130 by an input/output bus, a network, and the like.

The migration engine 110 is further configured to migrate data from an initial placement of user data on the data storage system 130 to a target placement of user data in a unit of a pre-determined size. The migration engine 110 may yet further be configured to monitor performance parameters, e.g., disk access rates, CPU load, bus utilization, etc., of the computer system 110 and compare the performance parameters with performance goals of the foreground software applications 140 executing in the computer system 100. From the comparison, the migration engine 110 may be configured to regulate the speed of a data migration to ensure that the user expectation of performance or pre-determined performance goals of software applications executing in the foreground are met. As such, migration engine 110 may migrate data on-line without any substantial performance degradation of the computer system 100 executing software applications 140.

Figure 2:
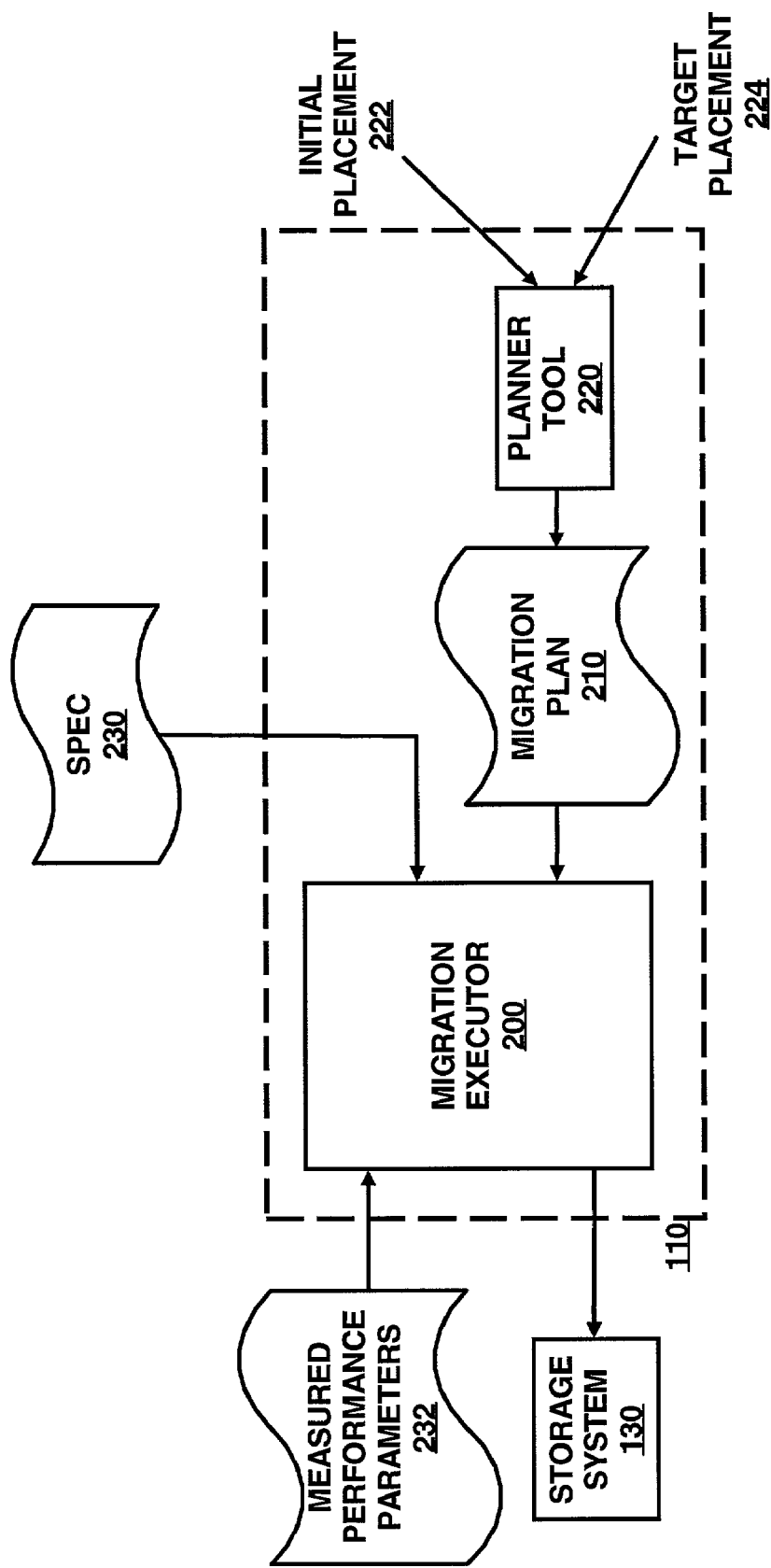
FIG. 2 illustrates a more detailed block diagram of the migration engine shown in FIG. 1.

FIG. 2 illustrates a more detailed block diagram of an exemplary embodiment of the migration engine 110 according to the principles of the present invention. In particular, the migration engine 110 includes a migration executor 200 and a planner tool 220.

The migration executor 200 of the migration engine 110 may be configured to migrate data on the data storage system 130 according to a migration plan 210. The migration plan 210 may be a text file, a formatted data file, or the like. The migration plan 210 may be generated by the planner tool 220, which is configured to automatically generate the migration plan 210 in response to an input of an initial placement 222 of user data on the data storage system 130 and a target placement 224 of user data on the data storage system 130. Alternatively, the migration plan 210 may be generated manually by a user of the migration engine 110.

Another input to the migration engine 110 is a specification 230 of the performance goals of software applications executing in the foreground of the CPU 120 of the computer system 100. The specification 230 may be a text file, a formatted data file, or the like. The specification 230 may be automatically generated by a performance analysis tool (not shown). Alternatively, the specification 230 may be generated manually.

The migration executor 200 may be further configured to monitor performance metrics 232, e.g., disk access rates, CPU load, bus utilization, etc., of the computer system 100. The migration executor 200 may be further configured to compare quality-of-service ("QOS") parameters derived from the measured performance metrics 232 with the performance goals stored in the specification 230. An example of a derived QOS parameter is the average number of input-output operations per second ("iops") per storage device in the system. From the comparison, the migration executor 200 may be further configured to adjust a speed or rate of execution of the migration plan 210. As such the migration executor 200 may be configured to regulate the speed of a data migration to ensure that a user's expectation of performance or pre-determined performance goals of software applications executing in the foreground are met.

The migration executor 200 may be further configured to adjust a speed of execution of the migration plan 210 in response to a violation goal, where a violation goal may be defined as a maximum number of times the sampled QOS parameters may not satisfy the performance goals over a total number of accesses to a data storage system. The migration executor 200 may be configured to adjust the speed of the on-line data migration so as to keep the performance violations below the violation goal.

Figure 3:
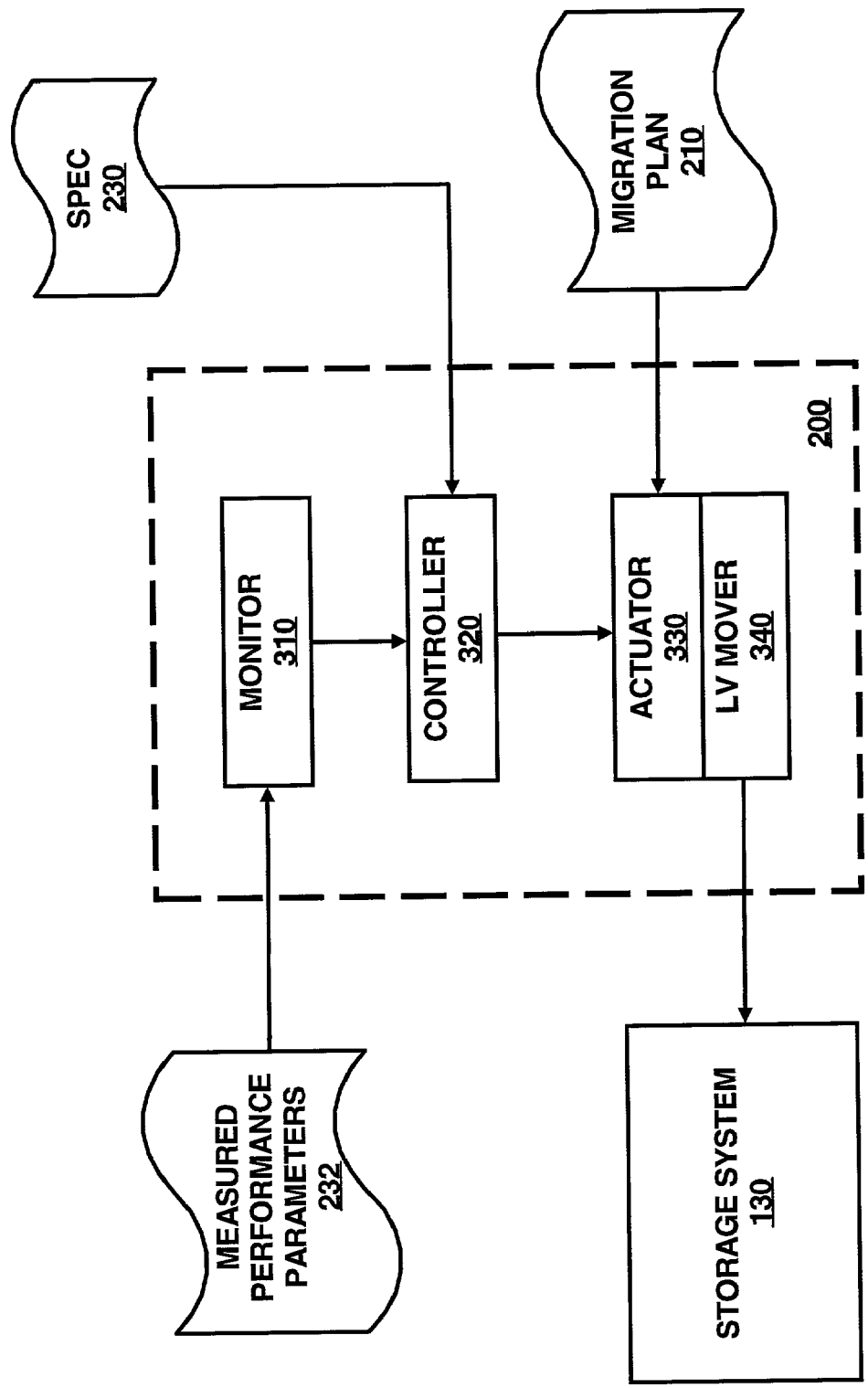
FIG. 3 illustrates a more detailed block diagram of an exemplary embodiment of a migration executor according to the principles of the present invention.

FIG. 3 illustrates a more detailed block diagram of an exemplary embodiment of the migration executor 200 of the migration engine 110. As shown in FIG. 3, the migration executor 200 may include a monitor module 310, a controller module 320, an actuator module 330, and a logical-volume ("LV") mover module 340.

The monitor module 310 of the migration executor 200 may be configured to periodically monitor or sample the performance metrics of the computer system 100, where the interval between samples and the duration of each sample may be user-adjustable. The monitor module 310 may also be configured to invoke a software utility to retrieve the performance metrics from the computer system 100. Alternatively, a daemon process may be invoked on the computer system 100 to forward the sampled performance metrics to the monitor module 310 at a periodic interval. The monitor module 310 may be further configured to forward the QOS parameters derived from the measured performance metrics 232 to the controller module 320.

The controller module 320 may be configured to calculate a control output, an inter-move time ("$T_{im}$"), based on the comparison of the sampled QOS parameters computed by the monitor module 310 with the performance goals from the specification 230. The controller module 320 may also be configured to forward the control output, $T_{im}$, to the actuator module 330. The controller module 320 may be configured to calculate the inter-move time based on the comparison of the QOS parameters with a violation goal.

The actuator module 330 may be configured to execute an on-line data migration according to a migration plan 210. As described herein above, the migration plan maps out the on-line data migration as a partially ordered set of moves, where each move includes moving a discrete block of data from a source position to a destination position. The actuator module 330 may also be configured to initiate consecutive moves at times separated by the inter-move time, $T_{im}$, interval. In other words, the actuator module 330 may execute a move and wait the inter-move time, $T_{im}$, before executing the next move. In executing a move, the actuator module 330 may be further configured to issue a command specifying the source and destination location of a block of data specified by the migration plan. As such, by regulating the inter-move time $T_{im}$, the rate or speed of the data migration may be adjusted.

The actuator module 330 may be further configured to store the entire migration plan 210 prior to execution of an on-line data migration. Alternatively, the actuator module 330 may receive a subset of the migration plan 210 at the inter-move time, $T_{im}$, interval.

The LV mover 340 may be configured to create a mirror copy of a specified block of data on a destination device within the data storage system 130 and then initiate an erasure of the specified block from a source device within the data storage system 130 in response to receiving a command from the actuator module 330. The LV mover 340 may also be configured to provide the capability of adjusting the size of the block of data that is moved.

Figure 4:
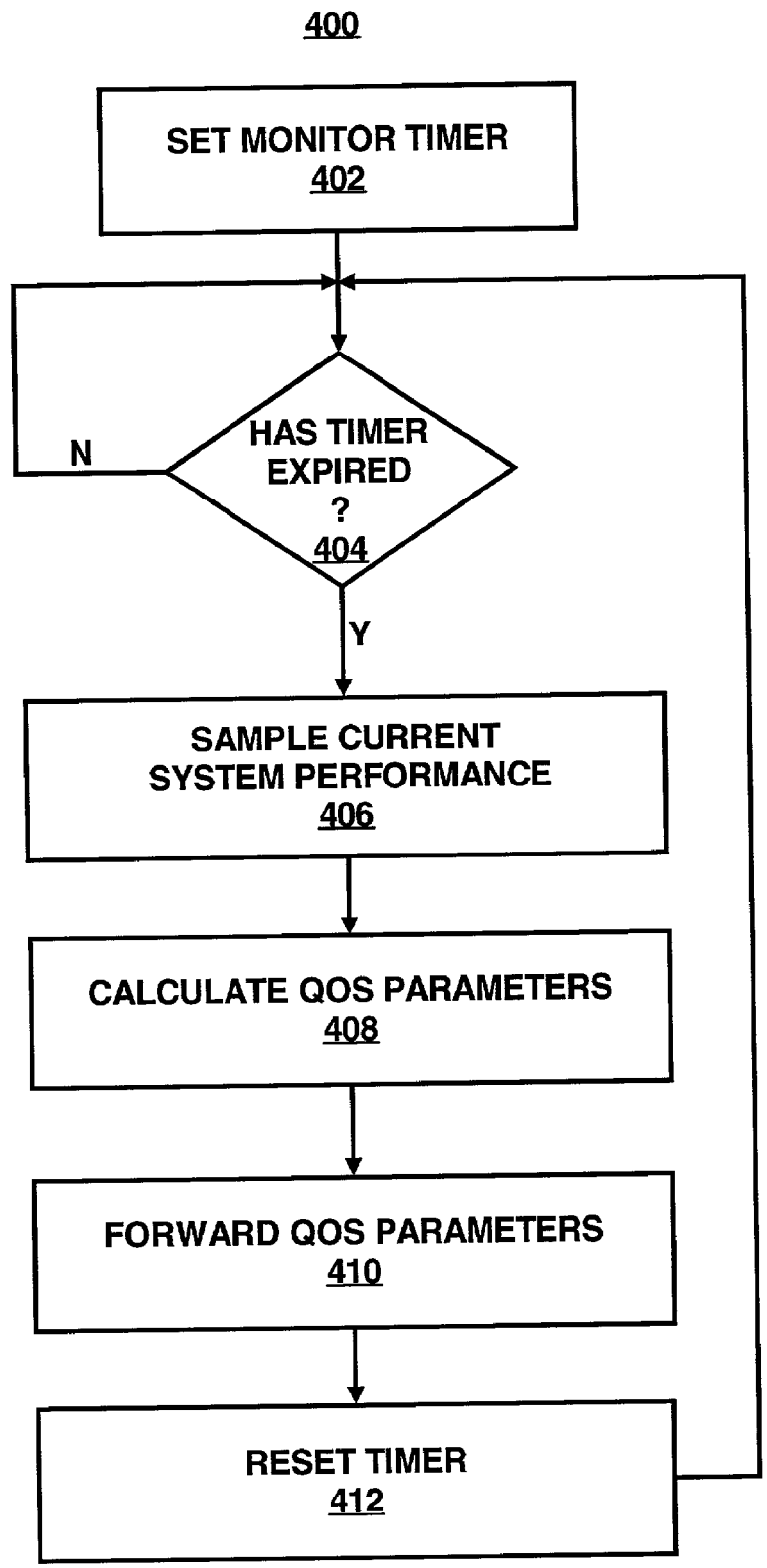
FIG. 4 illustrates a flow diagram of an exemplary embodiment of a monitor module of the migration executor shown in FIG. 3.

FIG. 4 is an illustration of an exemplary embodiment as a flow diagram 400 of the monitor module 310 shown in FIG. 3. As shown in FIG. 4, the monitor module 310 may be configured to initiate a monitor timer with a sampling interval as specified by a user of the system, in step 402. Alternatively, the monitor timer may be set with a default value, e.g., 30 sec. In step 404, the monitor module 310 may be configured to determine whether the monitor timer has expired. If the monitor timer has not expired, the monitor module 310 may be configured to return to step 404 until the monitor timer has expired. Otherwise, if the monitor timer has expired, the monitor module 310 may be configured to sample the current system performance by retrieving measurements for system metrics such as iops, latency, CPU load, etc., in step 406. Alternatively, a daemon process may be invoked within the computer system 100 to gather said measurements and forward them to the monitor module 310.

In step 408, the monitor module 310 may be configured to compute the QOS parameters needed by the control algorithm, taking as input the metrics monitored on the running system. In step 410, the monitor module 310 may be configured to forward the QOS parameters to the controller module 320. The monitor module 310 may be further configured to forward the QOS parameters as a text file, a data file, or the like. In step 412, the monitor module 310 may be configured to reset the monitor timer and return to step 404.

Figure 5:
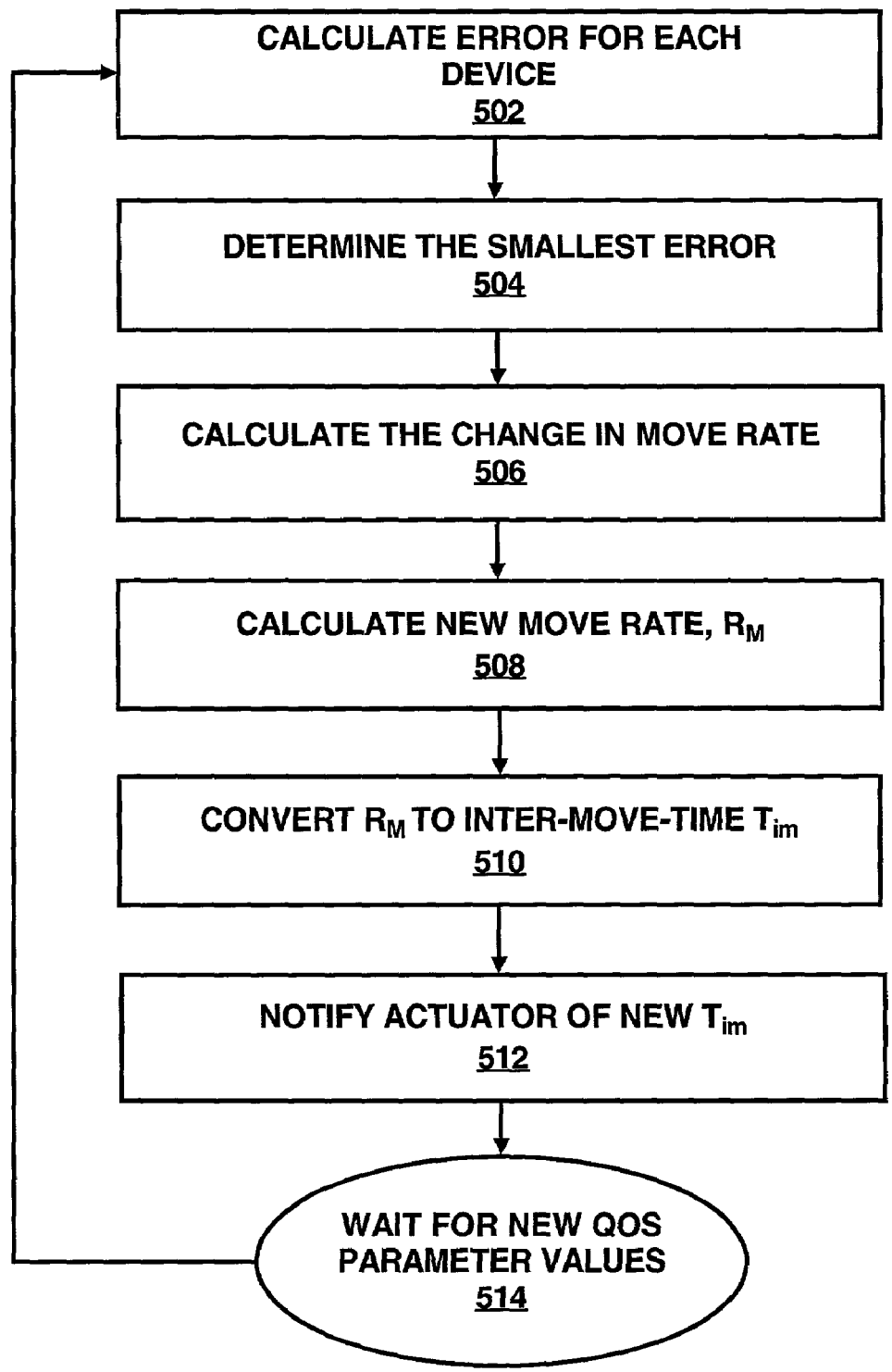
FIG. 5 illustrates a flow diagram of an exemplary embodiment of a controller module of the migration executor shown in FIG. 3.

FIG. 5 illustrates an exemplary flow diagram 500 of the controller module 320 shown in FIG. 3. The following equations are intended to illustrate the general process depicted in FIG. 5 for the particular case in which the QOS parameter is throughput (or, equivalently, number of iops). Although the current embodiment utilizes throughput as the QOS parameter, the present invention contemplates the use of other QOS parameters such as latency, CPU load, and the like, for optimization. Although the rate at which moves are initiated is the only output of the controller module 320 in the current embodiment, the present invention could also use other forms of control output such as the speed at which each individual move is performed by the actuator module 330. Multiple control outputs could be generated by each iteration of the controller module 320. Similarly, although the fraction of all accesses that have suffered a QoS violation so far during the migration is not an input to the controller module 320 in the embodiment described in this document, the present invention could also take that parameter as an additional input to compute the control outputs. The controller module 320 would then compute its control outputs in such a way that the fraction of QoS violations is kept below a violation goal. Said extensions could be done by using standard control-theory techniques, as known to one of ordinary skill in the art.

In step 502, the controller module 320 may be configured to calculate an error for each storage device in the computer system 100 in response to the forwarded QOS parameters from the monitor module 310. At each sampling time instant k·SP, where SP is the duration of a sampling interval of the monitor module 310 and k is a positive integer, the error for each device may be calculated from Equation 1:

$$E_i(k) = I_i(k) - IS_i \qquad (1)$$

where i represents a storage device, $IS_i$ is the iops specification or performance goal for device i, and $I_i(k)$ represents the sampled number of iops in the time interval $((k-1)\cdot SP, k\cdot SP)$ from the monitor module 310 for device i. If the error value is negative for a storage device i, this is an indication that the throughput is less than the performance goal for the device i.

In step 504, the controller module 320 may be configured to determine the smallest error value for all the N storage devices in the system, by Equation 2:

$$E_{min}(k) = \min\{E_i(k) | 0 \leq i < N\} \qquad (2)$$

In step 506, the controller module 320 may be configured to compute the change in move rate according to a standard proportional-integral ("PI") control function as defined by Equation 3:

$$dR_m(k) = KP \cdot \left( E_{min}(k) + KI \cdot \sum_{1 \leq u \leq k} E_{min}(u) \right) \qquad (3)$$

where $dR_m(k)$ is the change in move rate, and KP and KI are control gains (parameters of the controller).

In step 508, the controller module 320 may be configured to compute a new move rate as defined by Equation 4:

$$R_m(k) \leftarrow R_m(k-1) + dR_m(k) \qquad (4)$$

where $dR_m(k)$ is the change in the move rate and $R_m(k)$ is the move rate in the next sampling interval $(k\cdot SP, (k+1)\cdot SP)$ for the controller module 320.

In step 510, the move rate, $R_m(k)$, is converted to an inter-move time, $T_{im}(k)$, by Equation 5:

$$T_{im}(k) = SP / R_m(k) \qquad (5)$$

where $R_m(k)$ is the new move rate from equation 4.

In step 512, the controller module 320 may be configured to forward the new inter-move time, $T_{im}(k)$, to the actuator module 330. Subsequently, the controller module 320 may be configured to enter a wait state until the next set of QOS parameters from the monitor module 310 becomes available, in step 514.

It remains to show how to choose values for the controller parameters KI and KP. In one aspect of the present invention, the migration executor 200 with the data storage system 130 may be modeled in the z-domain by a transfer function $P(z)=G \cdot z^{-1}$ from the controller input $R_m(z)$ to the output $I_{min}(k+1)$ (the iops $I_i(k+1)$ of the device i with the smallest error $E_{min}(k+1)$) in the time interval (k·SP, (k+1)·SP). The term $z^{-1}$ represents a time delay of a sampling interval due to discrete time sampling. The process gain, G, is the derivative of the output $I_{min}(k+1)$ with respect to the input (move rate $R_m(k)$). The controller module 320 tuning should pessimistically assume the largest process gain $G_{max}$ (e.g., measured by profiling experiments) to guarantee stability in all cases. Similarly, the controller module 320 may be modelled as PI controller (Equation 3) multiplying an integration (Equation 4), i.e., $C(z)=KP \cdot (1+KI \cdot z/(z-1)) \cdot z/(z-1)$. The closed loop model of the whole system including the controller module 320 and the computer system 100 is $P_C(z)=C(z) \cdot P(z)/(1+C(z) \cdot P(z))$. From the closed loop model of the whole system, KI and KP may be calculated using standard control theory techniques (e.g., the Root-Locus method or frequency-domain analysis), as known to one of ordinary skill in the art.

Figure 6:
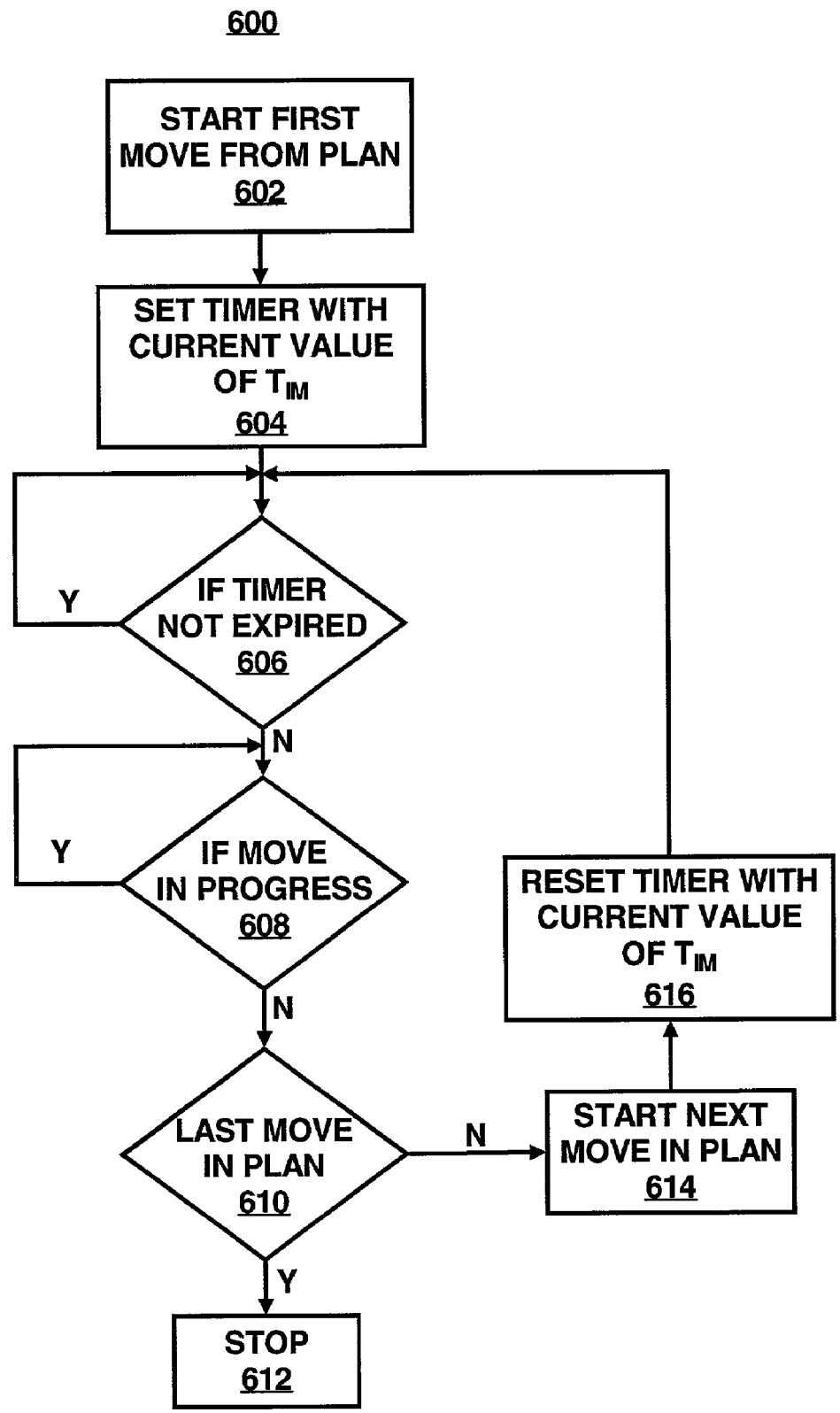
FIG. 6 illustrates a flow diagram of an exemplary embodiment of an actuator module of the migration executor shown in FIG. 3.

FIG. 6 illustrates an exemplary flow diagram 600 of the actuator module 330 shown in FIG. 3. Although in the current embodiment there is at most one move in progress at any given time, the present invention also contemplates the case in which multiple moves occur concurrently in time. As shown in FIG. 6, in step 602, the actuator module 330 may be configured to initiate a migration plan by starting a first move in the migration plan. In step 604, the actuator module 330 may be further configured to set an inter-move timer with the current value of the inter-move time from the controller module 320.

In step 606, the actuator module 330 may be configured to determine whether the inter-move timer has expired. If the inter-move timer has not expired, the actuator module 330 returns to the beginning of step 606. Otherwise, the actuator module 330 may be further configured to test whether there is a previous move in progress being processed the actuator module 330, in step 608.

If there is a previous move in progress, the actuator module 330 may be configured to return to step 608. Otherwise, the actuator module 330 may be configured to test whether the current move is the last move in the migration plan in step 610.

If the current move is the last move, the actuator module 330 may be configured to cease operation, in step 612. Otherwise, in step 614, the actuator module 330 may be further configured to start the next move from the migration plan. In step 616, the actuator module 330 may be further configured to reset the inter-move timer with the current value of the inter-move time from the controller 320 and return to step 606.

Figure 7:
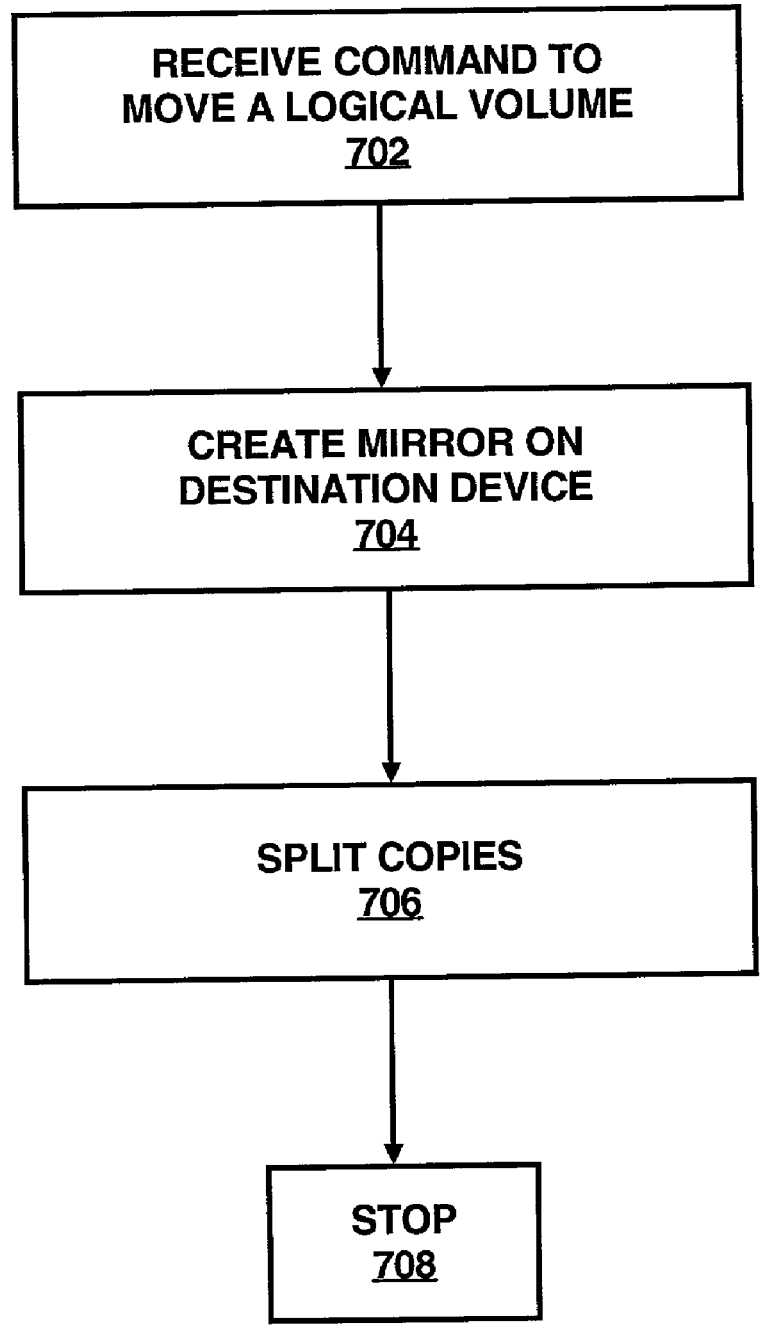
FIG. 7 illustrates a flow diagram of an exemplary embodiment of a logical volume mover of the migration executor shown in FIG. 3.
Figure 8:
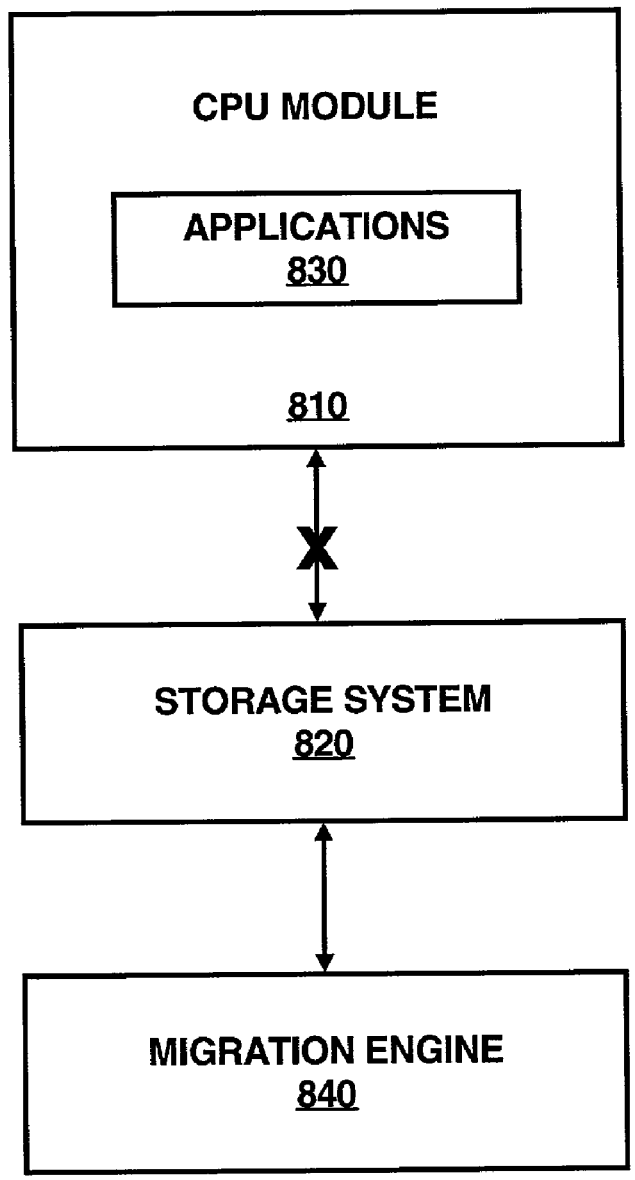
FIG. 8 illustrates a block diagram of a conventional data migration system.
Figure 9:
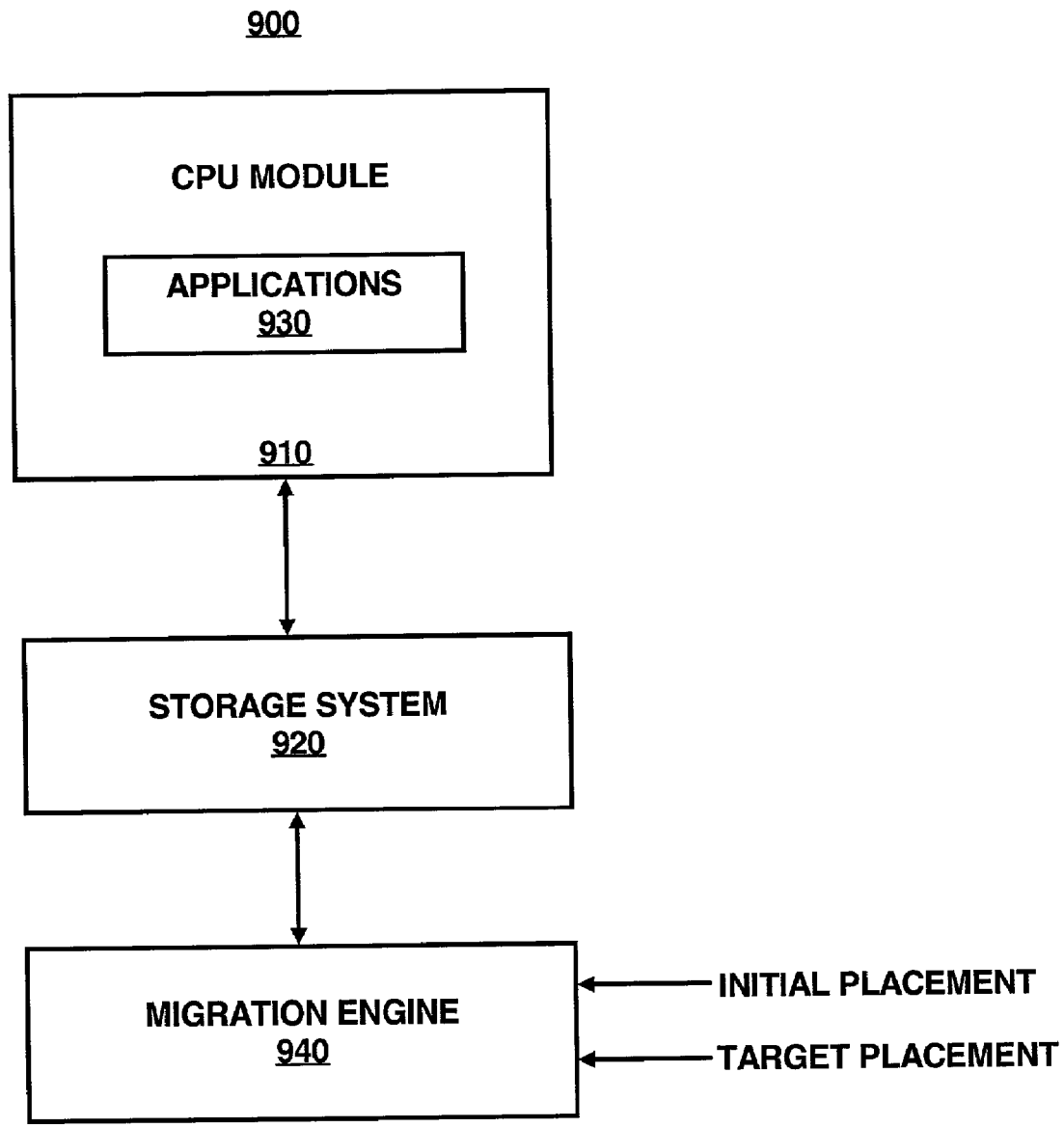
FIG. 9 illustrates a block diagram of another conventional data migration system.

FIG. 7 illustrates an exemplary flow diagram 700 of the LV mover 340 shown in FIG. 3. In particular, the LV mover 340 may be configured to receive a command for moving a logical volume, where the command specifies at least a source location (e.g., the path of the logical volume to be moved), and a destination device from the actuator module 330, in step 702. The LV mover 340 may be configured to create a mirror copy of the designated logical volume on the destination device specified in the received command, in step 704. The LV mover 340 may be configured to begin erasing, after step 704, the designated logical volume from the source device while guaranteeing that concurrent accesses are handled correctly, in step 706. An invocation of the LV mover 340 terminates after the erasing of the designated logical volume from the source device, in step 708.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for migrating data, said method comprising:
   moving a set of data in a data storage system of a computer system;
   monitoring a performance of at least one executing application, while said moving is in progress;
   calculating a change in a rate of said moving in response to said monitored performance of the at least one executing application; and
   modifying said rate of said moving in accordance with said calculated change.

2. The method for migrating data according to claim 1, further comprising:
   setting a performance goal for said at least one executing application, wherein said rate of said moving is increased in response to said monitoring of said performance exceeding said performance goal.

3. The method for migrating data according to claim 1, further comprising:
   setting a performance goal for said at least one application, wherein said rate of said moving is decreased in response to said monitoring of said performance not achieving said performance goal.

4. The method for migrating data according to claim 1, further comprising:
   inputting an initial placement of said set of data;
   inputting a target placement of said set of data;
   developing a migration plan, said migration plan configured to plan said moving of said set of data from said initial placement to said target placement; and
   executing said migration plan to implement said moving of said set of data.

5. The method for migrating data according to claim 4, further comprising:
   setting a performance goal for said at least one executing application; and
   wherein said monitoring of said performance is conducted at a periodic sampling interval.

6. The method for migrating data according to claim 5, further comprising:
   modifying said rate after said periodic sampling interval in response to said performance of said at least one executing application.

7. The method for migrating data according to claim 6, further comprising:
   increasing said rate in response to said performance of said at least one executing application exceeding said performance goal.

8. The method for migrating data according to claim 6, further comprising:
decreasing said rate in response to said performance of said at least one executing application exceeding said performance goal.

9. The method for migrating data according to claim 5, further comprising:
setting a violation goal, wherein said violation goal is a maximum percentage of performance violations of all accesses; and
restricting, based on the results of said monitoring, said performance violations not to exceed said violation goal.

10. The method for migrating data according to claim 1, wherein:
said set of data is moved in increments of portions contained within a logical volume.

11. A system for migrating data on a computer system, said system comprising:
a monitor configured to monitor a performance of at least one application executing on said computer system;
a controller configured to compare said performance with a performance goal of said at least one application; and
an actuator configured to adjust a rate of movement of a set of data from one location in said computer system to another location in said computer system, wherein said controller is further configured to calculate a change in said rate of movement in response to said comparison of said performance and said performance goal and adjust said rate of movement in accordance with the calculated change.

12. The system for migrating data on a computer system according to claim 11, further comprising:
a logical volume mover configured to move data in increments of portions contained within a logical volume, wherein said actuator is further configured to issue commands to a manager of said logical volume to adjust said rate of movement of said set of data.

13. The system for migrating data on a computer system according to claim 12, further comprising:
a planner configured to generate a migration plan in response to an input of an initial placement map of said set of data and a target placement map of said set of data, wherein said migration plan is configured to provide a partially ordered set of moves for said set of data and to be executed by said actuator.

14. The system for migrating data on a computer system according to claim 12, wherein:
said actuator is further configured to issue a command to increase said rate of movement of said set of data in response to said controller determining said performance exceeds said performance goal.

15. The system for migrating data on a computer system according to claim 12, wherein:
said actuator is further configured to issue a command to reduce said rate of movement of said set of data in response to said controller determining performance does not achieve said performance goal.

16. A computer readable medium on which is embedded one or more computer programs, said one or more computer programs implementing a method for migrating data on a computer system, said one or more computer programs comprising a set of instructions for:
moving a set of data in a data storage system of a computer system;
monitoring a performance of at least one application executing on a computer system;
calculating a change in a rate of said moving in response to said monitored performance of the at least one application; and
modifying said rate of said moving in accordance with said calculated change.

17. The computer readable storage medium according to claim 16, said one or more computer programs further comprising a set of instructions for:
inputting an initial placement of said set of data;
inputting a target placement of said set of data;
developing a migration plan, said migration plan configured to plan said moving of said set of data from said initial placement to said target placement; and
executing said migration plan to implement said moving of said set of data.

18. The computer readable storage medium according to claim 17, said one or more computer programs further comprising a set of instructions for:
setting a performance goal for said at least one executing application, wherein said monitoring of said performance is conducted at a periodic sampling interval.

19. The computer readable storage medium according to claim 18, said one or more computer programs further comprising a set of instructions for:
setting a violation goal, wherein said violation goal is a maximum percentage of performance violations of all accesses; and
restricting, based on the results of said monitoring, said performance violations not to exceed said violation goal.

20. The computer readable storage medium according to claim 18, said one or more computer programs further comprising a set of instructions for:
modifying said rate after said periodic sampling interval in response to said performance of said at least one application.

21. The method for migrating data according to claim 1, further comprising:
calculating an error value for the performance of said at least one executing application; and
using said error value to calculate said change in said rate of said moving according to a control theory technique.

22. The system for migrating data according to claim 11, wherein said controller is further configured to calculate an error value for said performance of said at least one application and to calculate said change in said rate of movement using said error value in at least one control theory equation.

23. A system for migrating data on a computer system, said system comprising:
means for monitoring a performance of at least one application executing on said computer system;
means for comparing said performance with a performance goal of said at least one application;
means for calculating a change in a rate of movement of a set of data from one locating in said computer system to another location in said computer system;
means for adjusting said rate of movement of said set of data according to said change; and
means for determining an error value associated with said performance of said at least one application, wherein said means for calculating uses said error value to calculate said change in said rate of movement.

* * * * *

UNITED STATES PATENT AND TRADEMARK OFFICE
CERTIFICATE OF CORRECTION

| | | |
|---|---|---|
| PATENT NO. | : 7,167,965 B2 | Page 1 of 1 |
| APPLICATION NO. | : 09/843882 | |
| DATED | : January 23, 2007 | |
| INVENTOR(S) | : Guillermo A. Alvarez et al. | |

It is certified that error appears in the above-identified patent and that said Letters Patent is hereby corrected as shown below:

In column 11, line 4, in Claim 8, delete "exceeding" and insert -- not achieving --, therefor.

In column 12, line 57, in Claim 23, delete "locating" and insert -- location --, therefor.

Signed and Sealed this

Twenty-ninth Day of June, 2010

David J. Kappos
*Director of the United States Patent and Trademark Office*